Aug. 2, 1966  J. C. IRBY  3,263,644
COLLISION TRACKING DEVICE
Filed April 26, 1965
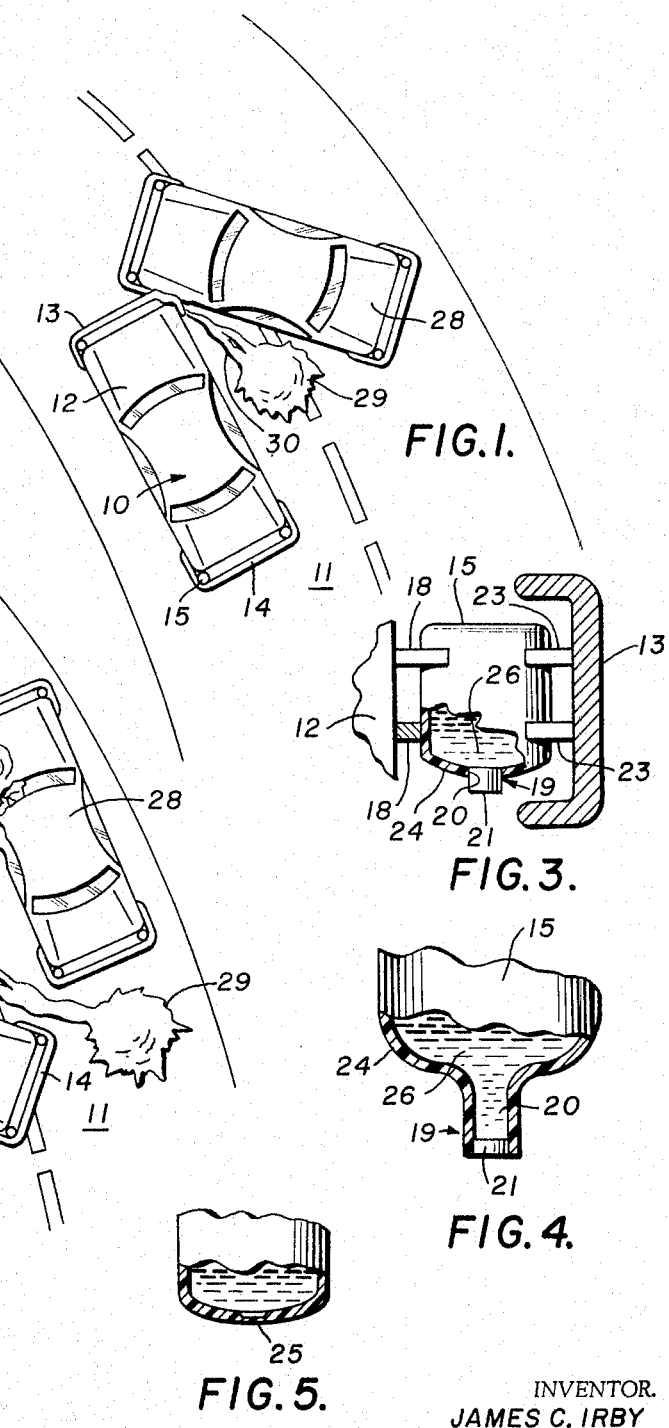
INVENTOR.
JAMES C. IRBY
BY
ATTORNEY United States Patent Office 3,263,644
Patented August 2, 1966

3,263,644
COLLISION TRACKING DEVICE
James C. Irby, 215 NE. Lafayette St., Decatur, Ala.
Filed Apr. 26, 1965, Ser. No. 450,800
2 Claims. (Cl. 116—32)

This invention relates to a collision tracking device, and more particularly, to a device which permanently marks a road surface at the point of impact between two colliding vehicles and traces the path of said colliding vehicles until their motion ceases.

With the advent of high speed motor vehicles, it has become apparent that some means is needed for permanently marking on a road surface the exact point of collision between the participating vehicles and the relative positions of each. The problem arises when two vehicles, each traveling at a relatively high speed, collide, with the occupants of each either being killed or not being able to recall who had the right of way. In determining who was at fault and thereby deciding ultimate liability, it is necessary to locate the position of each of the vehicles so involved at the instant of impact. Without some indicating means, this is impossible and often the guilty part is not exposed. The prior art including United States Patents 2,646,016 to Wilson, 1,855,956 to Gibbs, 1,594,298 to Pless and 2,042,689 to Wallace discloses indicating means; however, these devices are too inefficient and unsightly and depend on the breaking of a capsule in order for the indicating fluid to contact and stain a road surface. Also, they lack a means of tracking the vehicles after collision to their resting places.

Therefore, an object of this invention is to provide a device which directs an indicating fluid onto a road surface after being energized by an outside force, said device being located at various points about the periphery of a motor vehicle.

Another object of this invention is to provide a device which permanently traces the path of a motor vehicle on a road surface after the vehicle has collided with either another vehicle or a stationary object.

A further object of this invention is to provide a motor vehicle with a device for indicating the point of collision between the said vehicle and a foreign object.

A still further object of this invention is to provide a collision indicating device for motor vehicles which is not visible to an observer from positions away from said vehicle.

Yet another object of this invention is to provide a vehicle tracking device with a pressure sensitive nozzle, said nozzle being adapted to permit an indicating fluid to pass therethrough when an external force is exerted on said device.

These and other objects and advantages of this invention will become apparent from the following description when read in view of the accompanying drawings and finally pointed out in the appended claims.

FIGURE 1 is a plan view of two automobiles immediately after colliding showing the indicating fluid having been ejected onto the road surface.

FIGURE 2 is a plan view of two automobiles in a resting position showing a trail of indicating fluid leading from the point of impact to the point at which the colliding vehicles came to rest.

FIGURE 3 is a fragmentary cut-away view of the fluid indicating container showing its spatial relationship with the body of the car and the bumper.

FIGURE 4 is a fragmentary view of the fluid container showing an alternate species of the pressure sensitive nozzle.

FIGURE 5 is a fragmentary view of the fluid container showing another species of the pressure sensitive nozzle.

A preferred embodiment of this invention includes a plastic container which is filled with a permanent liquid dye. The plastic container is placed at the four strategic impact locations on a car which are generally under each headlamp and tail light and in the area between the bumper and the body of the car, the container being rigidly secured thereto by brackets or the like. The plastic container includes a pressure sensitive nozzle which ruptures when a force is applied to said container. The nozzle is positioned at the bottom of the container and pointed downwardly thereby directing a jet of liquid dye onto a road surface after being activated by an outside force; thus, a fluid communication is established directly between the container and the surface of the road.

The plastic container is generally made from a weather resistant, acid resistant, pliable material such as polyethylene and may be of any desirable shape so long as the shape is conducive for including a nozzle. The nozzle which is integral with the container is located in juxtaposition with the road surface and houses a plug or means which seals the entrance thereof. The design of the sealing means depends upon the specific vehicle for which it is to be used. Where the device is to be used on a small foreign automobile such as a Renault, the pressure plug should be relatively secure in the throat of the nozzle so that it will not become dislodged therefrom except after the bumper to which it is fastened has begun to crumble. If the device is to be used on a Diesel truck, the pressure plug should be much more sensitive to changes in volume in the plastic container since a small deformation in the bumper thereof requires a relatively great force. Therefore, the stronger the bumper, the more sensitive the pressure plug must be to an increase in the pressure thereon.

It is imperative that the vehicle tracking fluid or dye be of a substantially permanent kind which is weather resistant for at least several hours. Also, it is desirable to have each of the fluid containers house a different colored dye, thus enabling the inspector to determine immediately the position of each vehicle. A dye having a relatively permanent color may be Prussian Blue which is an inorganic dye formed by the oxidation of the white parcipitate obtained from a solution of ferrous sulfate and potassium ferrocyanide. A strong organic dye is Malachite Green which is a triphenylmethane dye being prepared from benzaldehyde and dimethylaniline. An organic dye having a weaker color is Methylene Blue which is a thiazine dye produced by oxidizing a mixture of P-amino-dimethylaniline and sodium thiosulfate. The particular dyes used are not important so long as they meet the requirement of remaining visible on a road surface for a period of at least several hours under adverse weather conditions. Also, an aluminum reflecting pigment may be incorporated into the colored tracing fluid; this additive having a relatively high degree of reflectance would permit an inspector carrying a light to investigate the scene of an accident at night. The aluminum flake or pigment tends to float near the surface of the liquid thereby allowing the liquid to retain its original color while giving the same a lustrous effect.

The invention is illustrated in connection with the accompanying drawings in which the figures are illustrative of the preferred embodiment of the invention.

The invention, which may be called a vehicle tracing device, is comprised of a vehicle 10 which may be of most any design so long as it is adapted to traverse a surface 11. Vehicle 10 is provided with a body 12 and bumpers 13 and 14 which are connected to said body by any conventional means. Bumpers 13 and 14 are curved around and encompass each of said corners of body 12 and laterally extend across the forward end 16 and the rearward end 17 of vehicle 10, respectively.

Between body 12 and bumper 13, flexible fluid container 15 is rigidly mounted by brackets 18 and 23. Other fluid containers may be similarly spaced about the periphery of vehicle 10. Brackets 18 and 23 are oppositely disposed and contourly shaped so as to fit the particular design of the fluid container 15, brackets 18 and 23 and fluid container 15 being joined by conventional mechanical apparatus or by a chemical bonding agent. It is advantageous to have brackets 18 and 23 of the same shape as container 15 so that when brackets 23 are pushed inwardly by some external force, pressure is uniformly built up in container 15 thereby eliminating the possibility of said brackets puncturing container 15. Fluid container 15 having a wall 24 is provided with a pressure sensitive nozzle 19 which includes an orifice 20 and a plug 21. The orifice 20 may be large or small depending on the amount of fluid to be ejected initially from the container and it may or may not be tapered as shown in FIGURE 4. By having a plug 21, container 15 may be used over again unless the body thereof has been punctured. However, container 15 may be provided with a weakened segment 25 in wall 24 as shown in FIGURE 5 which is sensitive to excessive pressures and which ruptures under designed pressures to direct a flow of colored fluid 26 downwardly onto a road surface.

In operation, vehicle 10 traveling on road surface 11 collides with vehicle 28 whereupon bumper 13 by means of brackets 23 exerts a positive force on fluid container 15. When the pressure in container 15 reaches a designed maximum, plug 21 which is mounted in opening 19 is dislodged therefrom. The greatly increased pressure immediately sends a jet of colored liquid 26 onto road surface 11 forming a spot 29 directly below the point of contact between the two vehicles. The rest of liquid 26 forms a trail or track 30 which leads from the locus of contact 29 to the resting position of the colliding vehicles. Therefore, an inspector can immediately ascertain the location of the vehicles at the place of collision and thereby determine relative liability.

Many different embodiments of this invention may be made without departing from the scope and spirit thereof. Therefore, it is to be understood that the invention is not to be limited to the specific embodiment shown and described herein, except as defined in the appended claims.

I claim:
1. In combination with a vehicle for traversing a road surface having a substantially rectangular body and front and rear inwardly facing and parallel bumpers peripherially mounted on and encompassing each corner of said rectangular body, a vehicle tracking device for each corner of said rectangular body, each such device comprising a liquid container of predetermined shape defined by a flexible side wall and top and bottom surfaces, said side wall being vertically mounted and secured in a position between said body and bumper of said vehicle, said container bottom surface being tapered to form a downwardly extending integral nozzle having an orifice opening in communication with said road surface, a brilliantly colored liquid dye filling said container, and a plug securely received by said nozzle and pressure fracturably sealing said orifice opening whereby upon the exertion of a force against said bumper, said side wall is resiliently compressed between said bumper and body to cause said plug to be dislodged from said nozzle and said liquid dye to be expelled under the pressure of said force exerted on said side wall and said dye to be directed downwardly by said nozzle onto said road surface.

2. The vehicle tracking device of claim 1 wherein said liquid dye includes a dispersion of aluminum flake for reflecting light when said dye is received by said surface.

References Cited by the Examiner

UNITED STATES PATENTS

| | | | |
|---|---|---|---|
| 1,594,298 | 7/1926 | Pless | 116—32 |
| 1,855,956 | 4/1932 | Gibbs | 116—32 |
| 2,042,689 | 6/1936 | Wallace | 116—32 |
| 2,646,016 | 7/1953 | Wilson | 116—32 |
| 2,836,143 | 5/1958 | Shofi | 116—124 |

FOREIGN PATENTS 1,082,762  6/1954  France.

LOUIS J. CAPOZI, *Primary Examiner.*